United States Patent
Tsai et al.

(10) Patent No.: US 9,513,111 B2
(45) Date of Patent: Dec. 6, 2016

(54) SELF-TENSED AND FULLY SPRING JACKETED OPTICAL FIBER SENSING STRUCTURE

(71) Applicant: JINN HER ENTERPRISE CO., LTD., Kaohsiung (TW)

(72) Inventors: Yung-Yu Tsai, Kaohsiung (TW); Chun-Chu Yang, Kaohsiung (TW)

(73) Assignee: Jinn Her Enterprise Co., Ltd., Kaohsiung (TW)

( * ) Notice: Subject to any disclaimer, the term of this patent is extended or adjusted under 35 U.S.C. 154(b) by 0 days.

(21) Appl. No.: 15/000,540

(22) Filed: Jan. 19, 2016

(65) Prior Publication Data

US 2016/0209208 A1 Jul. 21, 2016

(30) Foreign Application Priority Data

Jan. 20, 2015 (TW) .............................. 104101751 A

(51) Int. Cl.
*G01L 1/24* (2006.01)
*G01B 11/16* (2006.01)

(52) U.S. Cl.
CPC ..................................... *G01B 11/18* (2013.01)

(58) Field of Classification Search
CPC ........ G01B 11/18; G01B 11/16; G01B 5/30; G01B 11/20; G01N 3/08; G01N 33/085

USPC ...................... 73/800, 788, 760, 762; 356/52
See application file for complete search history.

(56) References Cited

U.S. PATENT DOCUMENTS

| 4,613,752 A | * | 9/1986 | Davis | .................... | G01P 15/006 250/227.19 |
| 2016/0209208 A1 | * | 7/2016 | Tsai | ....................... | G01B 11/18 |

* cited by examiner

*Primary Examiner* — Lisa Caputo
*Assistant Examiner* — Nigel Plumb
(74) *Attorney, Agent, or Firm* — Muncy, Geissler, Olds & Lowe, P.C.

(57) ABSTRACT

An optical fiber sensing spring of the present invention includes a longer cylindrical tension coil spring, a shorter cylindrical compression coil spring and a longer cylindrical tension coil spring that are connected in series to form a spring having the same inner and outer diameters. A single-mode optical fiber manufactured with a long section of fiber grating is placed in the manufactured spring. This section of the fiber grating is tensed to two ends of the cylindrical compression coil spring having a predetermined gauge length, and the force applied is released. A pre-tensing method for providing a maximum tolerable compression strain and manufacturing technology for this sensing element are then achieved. Thus, the self-tensed optical fiber sensing spring structure satisfies a standard 0.9 mm outer diameter, is fully spring jacketed by the full spring jacketing and protection layer, and forms a linear stress-strain relationship in an elasticity stretched elastic region.

24 Claims, 14 Drawing Sheets

SELF-TENSED AND FULLY SPRING JACKETED OPTICAL FIBER SENSING STRUCTURE

FIELD OF THE INVENTION

The present invention relates to a technology of a strain predetermining and strain measuring device based on physical properties of an optical fiber sensing spring and particularly, to a technology that predetermines a strain sensing range within an effective axial stress sensing region of a sensing element and accurately measures strain.

BACKGROUND OF THE INVENTION

In the prior art, a fiber grating is formed by an optical fiber to serve an optical fiber sensing function. According to different characteristics, shapes, uses and purposes of measuring points, a fiber grating may made into various structures to form excellent strain sensing elements that accurately measure strain values by means of an externally connected optical wavelength scanning apparatus. A fiber grating is also referred to as a Fiber Bragg Grating (to be referred to as an FBG), which may serve as a fiber grating sensor. In an FBG, the optical fiber is exposed by using a coherent laser, such that the index of refraction of the core of the illuminated section of the optical fiber is permanently changed, and that section of index of refraction of the optical fiber, also referred to as a fiber grating or an FBG, has bright and dark periodical striped intervals Λ. The manufacturing method of an FBG is as shown in FIG. 1A, FIG. 1B, FIG. 1C and FIG. 1D. Referring to FIG. 1A showing a sectional view of a common single-mode optical fiber, a bare optical fiber having an outer diameter of 125 μm is coated by plastic or resin to form an optical fiber having an outer diameter of 250 μm, and 101 represents a 125 μm bare optical fiber surrounding the resin region. In FIG. 1B, the 125 μm outside coating resin around the bare optical fiber is removed to prepare for manufacturing the fiber grating. FIG. 1C shows a manufactured fiber grating from the 125 μm bare optical fiber that is not coated by the resin. In FIG. 1C, 102 represents the optical fiber core, and 103 represents the section of fiber grating having a refractive index with bright and dark periodical striped intervals Λ. In FIG. 1D, the 125 μm bare optical fiber region of the fiber grating is re-coated by the resin to form a fiber grating having an outer diameter of 250 μm, and 104 represents the 250 μm outside diameter re-coating resin.

In an FBG by using a feedback effect generated by Bragg diffraction, a predetermined wavelength satisfying a Bragg condition, referred to as a feedback Bragg wavelength $\lambda_B$, is reflected in a direction reverse to the incident direction back to a scanning apparatus that emits lightwaves for further analysis, so as to measure whether a received wavelength is increased/decreased. The feedback Bragg wavelength $\lambda_B$ is represented by an equation:

$$\lambda_B = 2n\Lambda \quad (1)$$

In equation (1), Λ is the period of the FBG, and n is an effective refractive index of the optical fiber. When the strain is generated in the fiber grating by an external force received, a variance in the original interval Λ is ΔΛ, which is substituted into equation (1) to obtain:

$$\lambda_B = 2n\Delta\Lambda \quad (2)$$

According to the definition of the strain ε, the gauge length of the force receiving object is set to 1, and Δ1 is the length change due to the force received.

$$\epsilon = \Delta 1/1 = \Delta\Lambda/\Lambda \quad (3)$$

It is then obtained that:

$$\Delta 1 = (\Delta\Lambda/\Lambda)/1 = (\Delta\lambda_B/2n)/(\lambda_B/2n)1$$

Therefore:

$$\epsilon = \Delta 1/1 = \Delta\lambda_B/\lambda_B \quad (4)$$

Hence, the variance in the reflected Bragg wavelength $\lambda_B$ caused by the slightly increased length of Δ1 generated from applying stress on the optical fiber having 1 gauge length is $\Delta\lambda_B$. At the light transmitting end, i.e., the feedback reflecting end, a wavelength drift $\Delta\lambda_B$ in $\lambda_B$ is received. In other words, when the wavelength drift $\Delta\lambda_B$ is received as a force is applied on an optical fiber sensing element, it means that the variance increased in the optical fiber sensing element is Δ1 in length. Such may be utilized to measure whether the force, received by an optical fiber sensing element fixed in parallel by a gauge length of 1 on an object under test, causes a variance s measured during engineering strain to exceeds a limit. A breakage warning signal may be issued if the limit is exceeded. However, because physical properties of an FBG are affected by temperature changes, the wavelength drift $\Delta\lambda_B$ is also affected. Thus, when an FBG is applied as a sensing device, multiple sensing devices, placed next to one another or closely connected in series, are utilized to obtain reference values of the temperature changes, so as to further perform temperature compensation to correct the accuracy. Alternatively, a fiber grating placed in an optical fiber sensing element is implemented by a chirped fiber grating (CFG) structure. Thus, a dispersion effect is eliminated by two wavelengths (long and short) to overcome the issue of one single sensing element accuracy and to stay unaffected from the temperature.

As previously described, according to different characteristics, shapes, uses and purposes of measuring points, a fiber grating may made into various structures for optical fiber sensing. These structures are fixed in parallel on an object under test to measure a variance ε caused by a force received during engineering strain.

One common features of all conventional structures is that, a predetermined micro strain, e.g., −2500 μs, needs to be tensed to serve as a future tolerable compression amount after the sensing elements are placed at fixed sensing positions, or else an FBG without tensing may easily generate strain hysteresis and lose its accuracy. Thus, ideally, a fiber grating needs to be pulled to a starting wavelength of the measurement, and a minimum tolerable strain value with which the fiber grating can be measured also needs to be achieved. However, from aspects of engineering applications, it is impossible simulate conditions where an enormous object under test in normal use first is compressed, the fiber grating is then fixed, and the measurement is carried out after such compression is released to return to a normal state. Hence, one common feature of all conventional structures is that, a fiber grating is tensed to first obtain a tolerable compression amount of a measuring region.

In the manufacturing process or method of tensing a fiber grating to a tolerable compression of a measuring region, one of two ends of a manufactured FBG is first fixed to a starting point of a gauge length L of an object under test, and a force is applied on the other end of the FBG to pull the FBG to a wavelength of a set tolerable compression strain and then fixed to an ending point of the gauge length of the object under test. Thus, the fiber grating having a gauge length of the two fixed points is tensed, which is equivalently realizing the technology of forming a future maximum tolerable compression amount on the object under test in advance. Such simple tensing operation on one fiber grating is often applied to objects under test having different structures. To achieve an object of the same predicted maximum tolerable compression amount (e.g., −2500 μs), many different tensing methods, tools, parts and operations have been developed, hence complicating an originally simple tensing process of an FBG. These complicated manufacturing operations are quite costly and need to be standardized as well as simplified to reduce costs and to obtain a more accurate tensing amount. That is to say, a first drawback of a conventional FBG is that, although a conventional FBG needs to be tensed, there are no standardized and simple tensing carriers. That is one reason why current FBGs have not yet become standard optical sensing elements.

Further, conventionally, when one FBG is manufactured from one single-mode optical fiber, the structure is usually merely one bare fiber grating having an outer diameter of 0.125 mm (125 μm), and is prone to breakage and cannot withstand lateral pressure. Thus, acrylic or resin for protection is usually coated around the FBG to become an optical fiber having an outer diameter of 250 μm. However, the FBG and an externally connected optical fiber are still likely damaged by external forces, as the conventional fiber grating sensing element fixed on an object under test in FIG. 2. In FIG. 2, 201 is a 125 μm bare fiber grating, 202 is resin coating protection layer, 203 is an FBG region at the 125 μm optical fiber core, 204 is a resin re-coating protection layer, 205 is an PE outer jacketed material layer having an outer diameter of 0.9 mm, 206 is a fixing seat or a fixing adhesive of the FBG, and 207 is a fiber grating carrier or a structure of an object under test. In a conventional method for protecting an FBG, one layer of PE outer jacketed material having an outer diameter of 0.9 mm is added again around the fiber grating. To increase the strain sensitivity of a fiber grating having a section of about 10 mm, in a first method, at this section without the protection of the PE coating material having an outer diameter of 0.9 mm, two ends of the fiber grating are directly fixed to an area of the object under test of 207 by an adhesive. In a second method, two ends of the fiber grating are first fixed to a material same as that of the structure under test or a metal material to form a sensing element. This material same as the material of the structure under test or the metal material combined with the FBG is referred to as a fiber grating sensing element carrier, as 207 in FIG. 2. Two ends of the sensing element are fixed in parallel on the area under test, and the strain sensitivity accuracy is directly or indirectly obtained by a parallel measuring method within a linear elastic limit. As the outer coating material does not have a linear strain characteristic of elastically stretching within an elastic region (i.e., within the elastic limit), to prevent a drawback of plastic deformation caused by a tensile strength exceeding the endurance of the plastic coating material, the outer coating material does not cross the FBG sensing grating region. Such exposed fiber grating without protection, e.g., the region 208 that is an exposed and unprotected fiber grating region, is frequently one of the main reasons causing damage and breakage during the tensing operation, on-site installation process and a measuring process after the installation. Therefore, a fiber grating without the protection of outer coating material is a second drawback that sets back the standardization of optical fiber sensing elements.

In an on-site environment, when the coated optical fibers connected from two ends of the unprotected fiber grating region and having an outer diameter of 250 μm are further connected to external optical fiber segments, the optical fiber at these two ends is extremely slim and cannot be clearly observed, and are thus likely touched to result in optical power loss or breakage. The optical fibers externally connected from the two ends of the fiber grating region are unprotected by an appropriate material and are thus easily damaged or broken—such is a third drawback in standardized optical fiber sensing elements. Thus, to be distinguished and innovated from the technology of a single-mode optical fiber optical cable coating material, and in order to perfectly present a technology that satisfies both optical transmission optical cable technology and standardized optical sensing elements, a structure manufactured by one-time completed process that is an optical fiber sensing cable product formed through integrating a conventional single-mode optical fiber and a fiber grating needs to be provided.

SUMMARY OF THE INVENTION

To solve the three drawbacks of the prior art above, the present invention provides an optical fiber sensing spring. Refer to FIG. 3A and FIG. 3B for the optical fiber sensing spring of the present invention. FIG. 3A shows a sectional view of a spring structure and a fiber grating that are not yet assembled. FIG. 3B shows a sectional view of a structure of an optical fiber sensing spring. FIG. 3C shows a sectional view of an optical fiber sensing spring structure fixed to an object under test, with associated details to be described in a first embodiment. FIG. 3D is a perspective sectional view of an optical fiber sensing spring structure. A spring utilized in the optical fiber sensing spring structure of the present invention is as shown at the left side of FIG. 3A. The spring is a cylindrical coil spring, which has a predetermined fixed length and surrounds, jackets and protects a single-mode optical fiber placed therein. This spring includes a longer cylindrical tension coil spring 301, a shorter cylindrical compression coil spring 302 connected in series to the cylindrical tension coil spring 301, and a longer cylindrical tension coil spring 303 connected in series to the compression coil spring 302. The shorter cylindrical compression coil spring 302 is between the two longer cylindrical tension coil springs 301 and 303. Referring to FIG. 3A, d is an wire diameter of the coil springs, D is an average coil diameter of the coil springs, a is a pitch angle, and the pitch angle of the cylindrical compression coil spring is greater than the pitch angles of the two tension coil springs. In one embodiment (FIG. 3C shows), 301 is a 0.9 mm outer jacketing cylindrical tension coil spring, 302 is a 0.9 mm outer jacketing cylindrical compression coil spring, 303 is a 0.9 mm outer jacketing cylindrical tension coil spring, 201 is a 125 μm bare fiber grating, 202 is a resin coating protection layer having an outer diameter of 250 μm, 203 is grating FBG region at a 125 μm optical fiber core, 204 is a resin re-coating protection layer having an outer diameter of 250 μm, 207 is a fiber grating carrier or an object structure under test, 304 is an optical fiber lead-out from the fiber grating, 308 is an upper connecting ring of pre-tensed spring and optical fiber, 309 is a lower connecting ring of pre-tensed spring and optical fiber, 310 is an upper anchoring carrier frame (an adhesive or a welding point) of tension coil spring, and 311 is a lower anchoring carrier frame (an adhesive or a welding point) of tension coil spring. The spring forming the optical fiber sensing spring is formed by the cylindrical compression coil spring 302 that surrounds and protects the FBG and the cylindrical tension coil springs 301 and 303 that are manufactured (serialized and extended) from two ends of the cylindrical compression coil spring 302. The cylindrical compression coil spring 302, while providing a protection effect for the FBG therein, also achieves an effect of tensing the FBG. More specifically, to achieve the effect of tensing the FBG the spring are first compressed, the section of the FBG placed in the spring is fixed by the upper connecting ring 308 and the lower connecting ring 309, and the force applied is then released. The cylindrical tension coil springs, lead-out and extended at the two ends of the cylindrical compression spring, are tight springs having a initial tension force, and are hard but bendable. Thus, the cylindrical tension coil springs provide a protection function for the optical fibers internally lead-out and extended from the two ends of the FBG to outside the sensing element. Such cylindrical tension coil springs lead-out and extended not only are harder than conventional outer jacketed PVC or PE, but also has better flexural strength and bendability deflection.

For hundreds of years, using a mechanical property of linearly elastically stretching within an elastic limit of an elastic material, a conventional spring has successfully served the mechanical function of measuring. Particularly, among various types of springs, the linear spring property of a cylindrical coil spring is extensively applied. The strain deformation δ generated by applying a load P of a stress upon the spring can be expressed by equation (5) from the relationship between the load in FIG. 4 and deformation:

$$P=k\delta \quad (5)$$

$$k=P/\delta \quad (6)$$

In the above equations, P is the load applied on the spring, δ is the deformation within the elastic limit, and the spring constant k is the load required for producing one unit of deformation on the spring. Such relationship also satisfies the modulus of elasticity E in the relationship between engineering stress and strain, also referred a physical property of the Young's modulus, within an elastic limit. The modulus of elasticity is a slope of a stress-strain curve within in an elastic range. Such relationship is referred to as the Hooke's Law. In the research of the relationship between engineering stress and strain, σ is the engineering stress, ϵ is the engineering strain, and the two are represented by equation (7) below:

$$E=\sigma/\epsilon \quad (7)$$

In the above equation, σ is the engineering stress, e.g., the load P applied on the spring as in equation (6), and ϵ is the engineering strain, e.g., the deformation δ within the elastic limit in equation (6). Thus, the spring constant k for the spring in equation (6) is also similar to the modulus of elasticity E in engineering applications, with the modulus of elasticity E being the Young's modulus of the Hooke's Law, as one of the most frequently used for mechanical engineering in the history of springs. Therefore, the amount of deformation of a spring within the elastic limit is extremely suitable for serving as a precision measuring material or structure health monitoring (SHM) of a structure. Particularly, by placing an FBG with an optical wavelength change that is digitally measurable in the spring, the optical fiber sensing spring of the present invention can be formed. The optical fiber sensing spring of the present invention may be designed with an appropriate spring constant and a fiber grating having a modulus of elasticity can be placed in the optical fiber sensing spring, and may be connected in parallel to a fiber grating built with a modulus of elasticity therein. Thus, not only the surrounding cylindrical coil springs can protect the fragile optical fiber placed therein, but also the modulus of elasticity of the natural Hooke's Law can perform strain measurement within the elastic limit.

In the present invention, an FBG is placed in a spring assembly formed by cylindrical tension coil springs and a cylindrical compression coil spring to form an optical fiber sensing spring, as the structure shown in FIG. 3B, to measure the relationship between the elastic stress and strain of elastic stretching within an elasticity range to further the SHM detection technology. The operation principles of the optical fiber sensing spring of the present invention utilizing an FBE to detect the corresponding variance in response to an increased or decreased length in the spring are described below. Due to the load P of stress applied to the spring, the deformation generated within the elastic limit is the strain δ as in equation (6). The parallel force applied on the optical fiber connected in parallel in the spring may be measured from the strain ϵ in equation (4), i.e., from the wavelength change $\Delta\lambda_B$ in $\epsilon=\Delta l/l=\Delta\lambda_B/\lambda_B$. Thus, the change in the Bragg wavelength Δλ reflected from the micro varied length increased by Δl generated from applying stress on an optical fiber having a section length of 1 is $\Delta\lambda_B$. The amount of wavelength drift Δλ containing $\Delta\lambda_B$ is received at the light transmitting end, ie., the feedback reflecting end. On the other hand, if the wavelength drift $\Delta\lambda_B$ is received by applying a force on the optical fiber sensing spring assembly, it means that the variance in the tensed springs is Δl in gauge length 1. Such may serve for determining whether the amount of deformation ϵ regarding engineering strain due to a force received by the optical fiber sensing spring assembly having a gauge length of 1 and fixed in parallel on the structure of an object under test exceeds a limit. When the value exceeds the limited value that the engineering structure can withstand, a breakage warning signal may be issued. However, physical properties of an FBG are also affected by temperature changes, and the wavelength drift $\Delta\lambda_B$ is hence affected. Thus, when an FBG is applied as a sensing device, multiple sensing devices, placed next to one another or closely connected in series, are utilized to obtain reference values of the temperature changes, so as to further perform temperature compensation to correct the accuracy. Associated details are given in the second embodiment.

The strain ϵ in equation (4) may be calculated from the variance Δl in the gauge length 1 between the two fixed ends of the FBG in the cylindrical compression coil spring. However, the variance in the gauge length between the two fixed ends is extremely small to be even only a few micrometers, it is not only difficult to be noticed by a mechanism ruler but also likely unidentifiable to the naked eye. In the present invention, the method according to which the wavelength change at the back of equation (4) can be proportionally detected and calculated is applied. That is, the change Δl in the gauge length of the two fixed ends of the FBG in the cylindrical compression coil spring may be calculated according to the wavelength change reflected from the incident lightwaves entering the FBG. Thus, according to the wavelength drift $\Delta\lambda_B$ received after light is transmitted can be utilized to provide a new technology that adopts elastic properties of a spring as a precision measuring material of strain for optical progression. A novel feature of such new technology is that, in a spring structure formed by cylindrical tension coil springs and a compression coil spring, an FBG is placed at an axle of the compression coil sprig, a gauge length of the FBG is fixed by compressing the spring, and the compression coil spring is then released to achieve an effect of tensing the fiber grating. The above technology satisfies the technology of the modulus of elasticity by the elastic stretching in an elastic region, and achieves the object of setting a tensing value by implementing the Hooke's Law by a linear relationship. Thus, the compression spring, while achieving the effect of tensing the FBG by first fixing the FBG placed therein and then releasing the force applied, also forms a jacket having hardness similar to a steel casing to protect the fragile FBG inserted therein.

A relationship of the gauge length between the two fixed ends of the fiber grating in the cylindrical compression coil spring, the force P that first compresses and then released from the spring to achieve tensing of the fiber grating, and the spring deflection δ of deformation from the force received may be represented by an equation:

$$\delta = (8nD^3/Gd^4)P \quad (8)$$

In the above equation, d is an wire diameter of stainless steel, D is an average pitch diameter, G is a lateral elasticity coefficient, and n is the number of effective coils.

A spring index may be defined as c, and c=D/d. Thus, equation (8) may be represented by an equation:

$$\delta = (8nc^3/Gd)P \quad (9)$$
$$= (8nc^4/GD)P \quad (10)$$

The spring index c=D/d may be the basis for selecting the size of the spring structure to design a spring that satisfies various spring outer diameters, spring inner diameters, number of coils of the spring, magnitudes of tensing forces or a maximum tolerable compression stress. The lateral elasticity coefficient represented by G is the stress that is required for a material to generate a unit shear strain, and is a constant value that is determined by the characteristics of a material. The deflection of same-sized springs is inversely proportional to the G value of the material.

The other outer jacketing tight tension coil springs that jointly protect the fiber grating placed therein with the above compression coil spring and connect the optical fiber out from the two ends of the fiber grating also feature unique novelty as well as a technical inventive step. For novelty, the initial tension of the tension coil springs is used to protect the optical fiber placed therein, and the optical fiber sensing spring element that is fully spring jacketed by the assembly formed by the compression coil spring and the tension coil springs is then formed.

During the manufacturing process of the above tension coil spring, during cold forming, unique initial tension generated is different from the compression coil spring. In the calculation of the tension coil spring, the tension load of the spring takes effect mostly on the axle of the coil. Thus, basic equations for calculating load-deflection and load-stress relationships are identical to those of the compression coil spring. Usually, when the tension coil spring contains no load, no gap is present between the coils and so a tight and gap-less spring is formed. In the present invention, such firm metal jacket that is more flexural and bendable than any plastic is utilized to protect the optical fiber placed therein. The tight and gap-less tension spring formed by cold forming has spring properties shown by the relationship diagram of load and deflection in FIG. 5. Before the load P reaches a predetermined threshold $P_0$, the tension spring is hardly deformed. The external force applied is consumed on the balance of the residual compression stress generated when the coils are formed. The predetermined threshold $P_0$ is referred to as initial tension. Only when the load P is greater than $P_0$, an increased change in the deflection δ can then be caused. Preferably, the initial tension of steel wires is selected from experimental values, as a range indicated by an interval between the two lines in the relationship diagram of initial strain $\tau_0$ and spring index (c=D/d) in FIG. 6. The initial tension $P_0$ is calculated by an equation:

$$P_0 = (\pi d^3/8D)\tau_0 \quad (11)$$

When different materials are selected based on pliability or other property considerations, e.g., when stainless steel wires are selected, the initial tension is less than that of the steel material in the diagram by 15%, and is reduced by 50% when phosphor bronze wires or brass materials are used based on electric conductivity considerations.

In the present invention, the initial tension is applied to protect the protective tensile breaking force of the optical fiber placed therein from withstanding external forces. When a steel wire material is coiled into a tight form, the wire can no longer rotate freely, and is thus formed with a certain level of twisting to prevent elastic deformation along the axial direction of the spring. The force that causes the coils to be located tightly closely to one another in the absence of a load is referred to as initial tension. The inventive step of the present invention is to form an optical fiber sensing spring that is self tensed and self jacketed and protected. More specifically, using the initial tension, the optical fiber connected from the FBG is added with the tight and gap-less cylindrical tension coil springs hard as a metal but more flexural and bendable, such that the self jacketed and protected optical fiber sensing spring can be formed.

An FBG is placed in a spring to form an optical fiber sensing spring. The sensing spring device with the built-in FBG is an important optoelectronic component in waveguide optics, and may be extensively incorporated to applications of optical fiber communication, measuring apparatus control, connection strain measurement and sensing of physical data. Such sensing component may serve as a fundamental cell unit in the research, manufacturing and application of smart structures. The sensing component features advantages of being small in volume, light in weight, high in material strength, strong in geometric toughness, small in optical energy loss, high in transmission speed, and wide in bandwidth, as well as being high temperature and electromagnetic interference resistant. When applied in a highly radioactive environment and extensive use in harsh environments, the present invention provides stable characteristics and durability. Further, to provide critical advantages, in the present invention, one single optical fiber, having a simple structure, can be simultaneously connected in series to multiple measuring points to accurately measure strain physical amounts. Compared to some conventional solutions having complicated strain designs, manufacturing, and installation processes, the present invention is a hugely improved technology for component standardization.

DETAILED DESCRIPTION OF THE PREFERRED EMBODIMENTS

First Embodiment

Figure 1A:
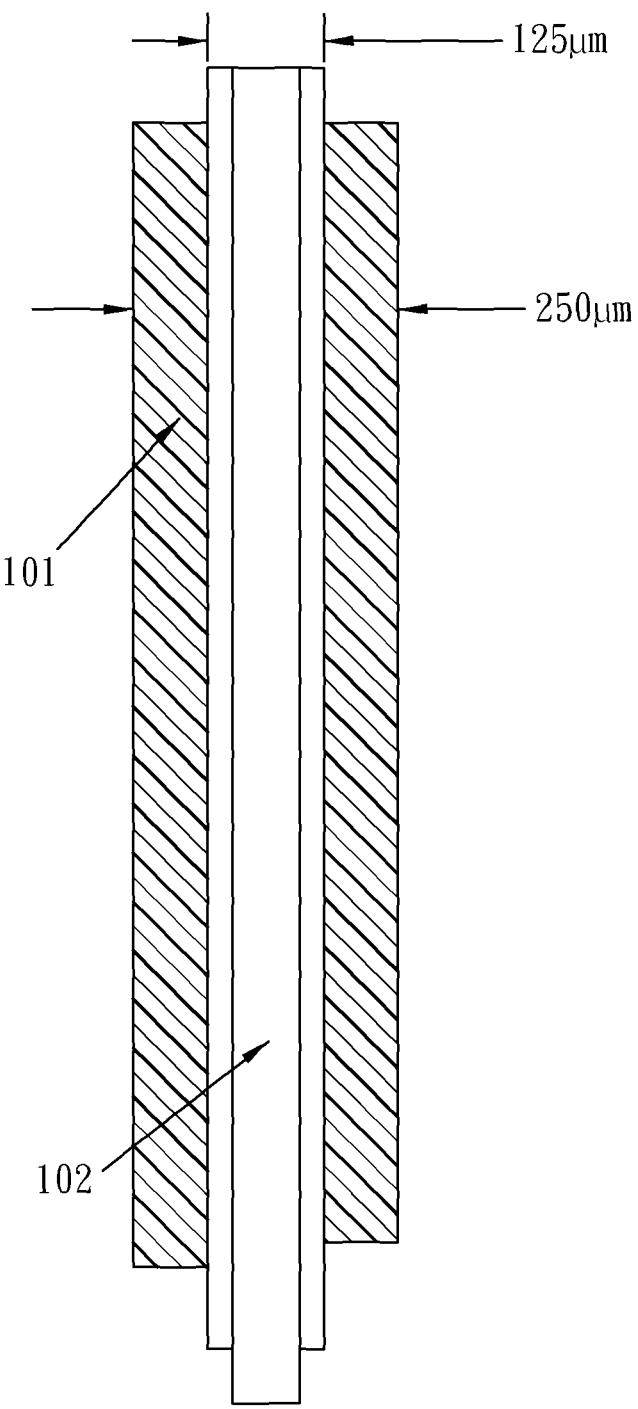
FIG. 1A is a sectional view of a common single-mode optical fiber.
Figure 1B:
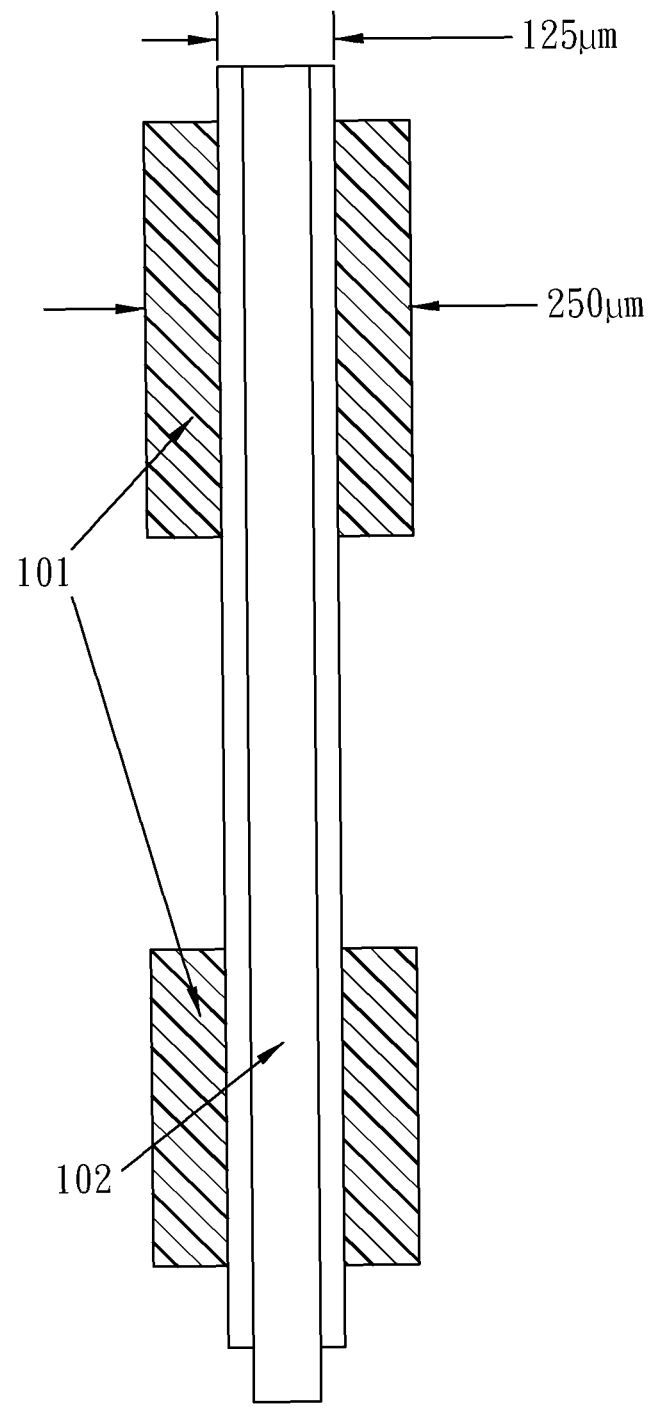
FIG. 1B shows the removal of an outer coating resin of a 125 μm bare optical fiber as preparation for manufacturing a fiber grating.
Figure 1C:
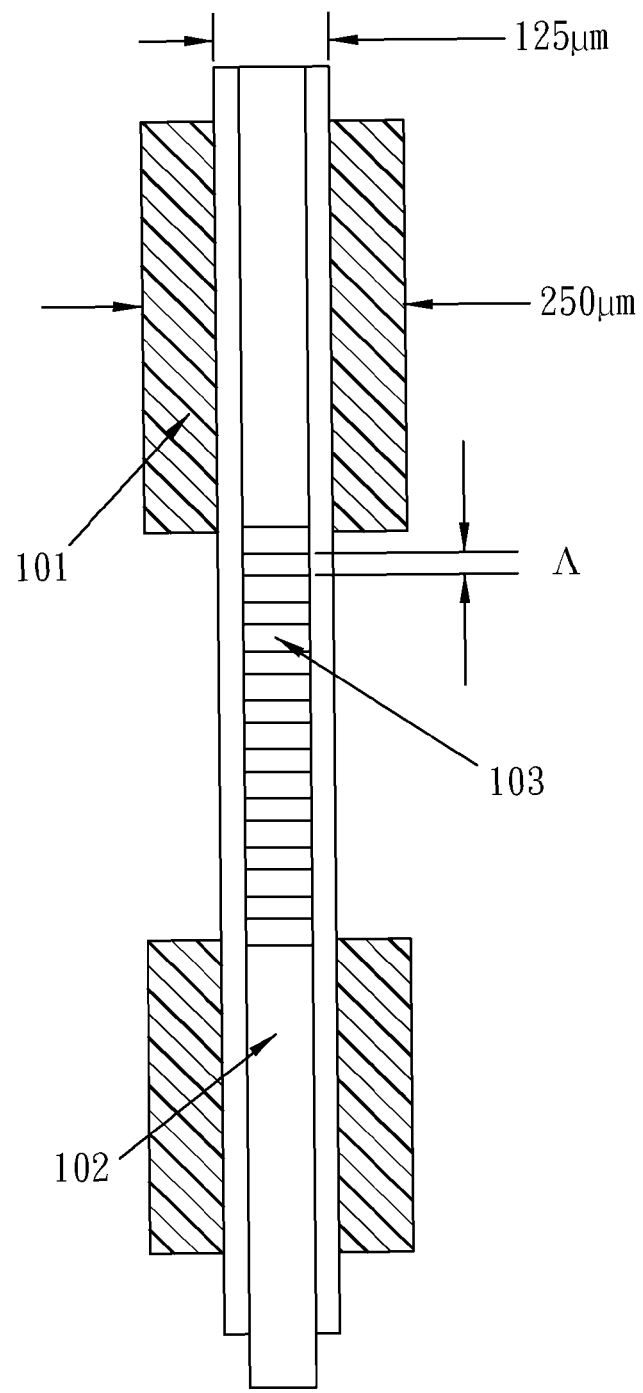
FIG. 1C shows a complete fiber grating made of a 125 μm bare optical fiber without an outer coating resin.
Figure 1D:
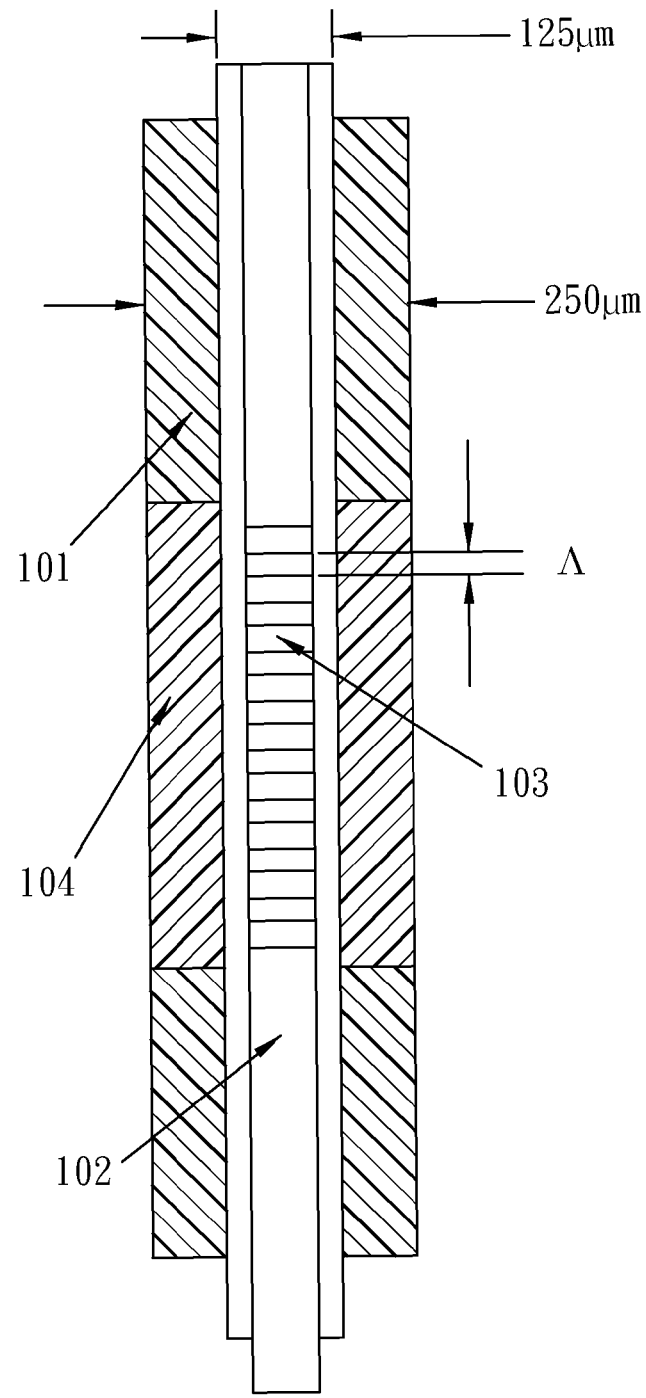
FIG. 1D shows a fiber grating having an outer diameter of 250 μm and manufactured from 125 μm bare optical fiber region of a fiber grating and an outer re-coating resin.
Figure 2:
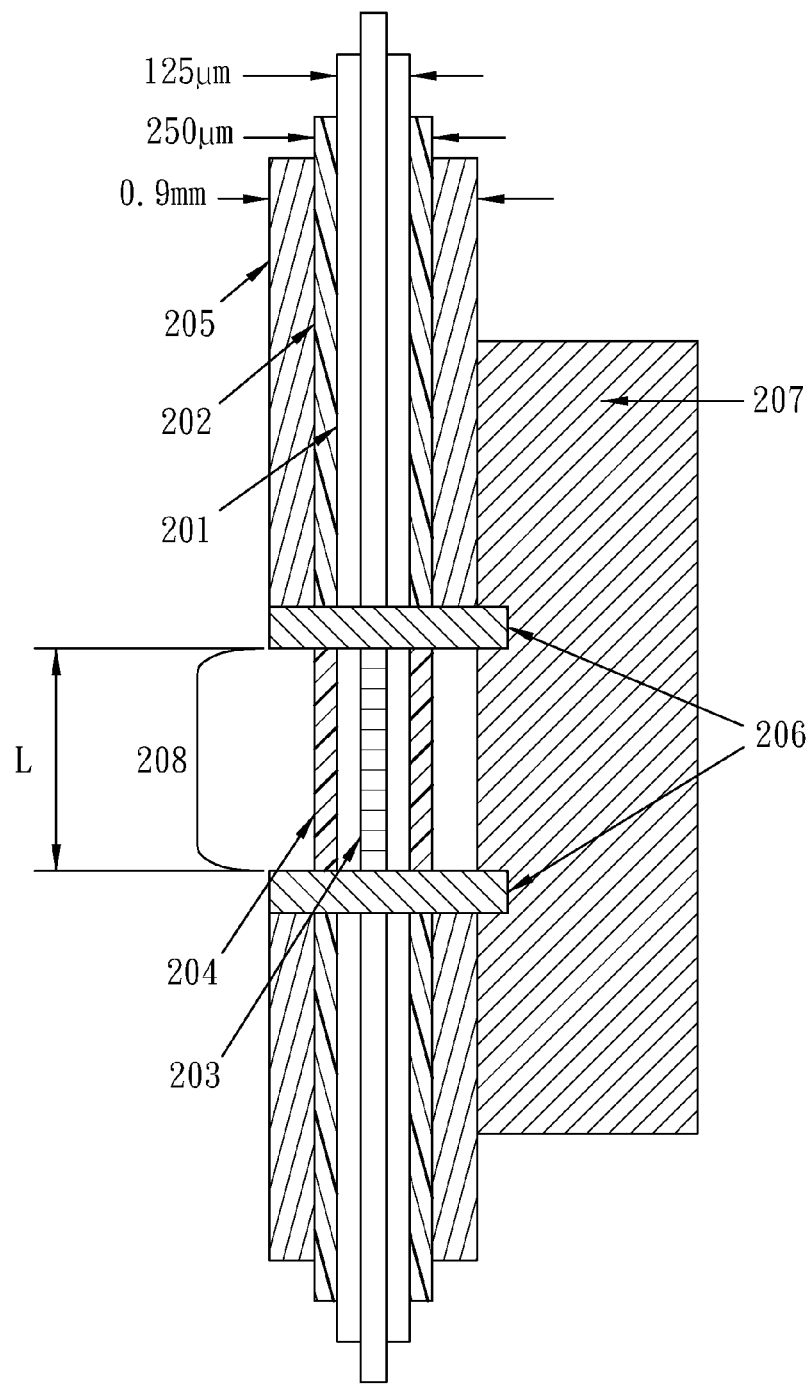
FIG. 2 is a conventional optical fiber sensing element fixed to a structure under test.
Figure 3A:
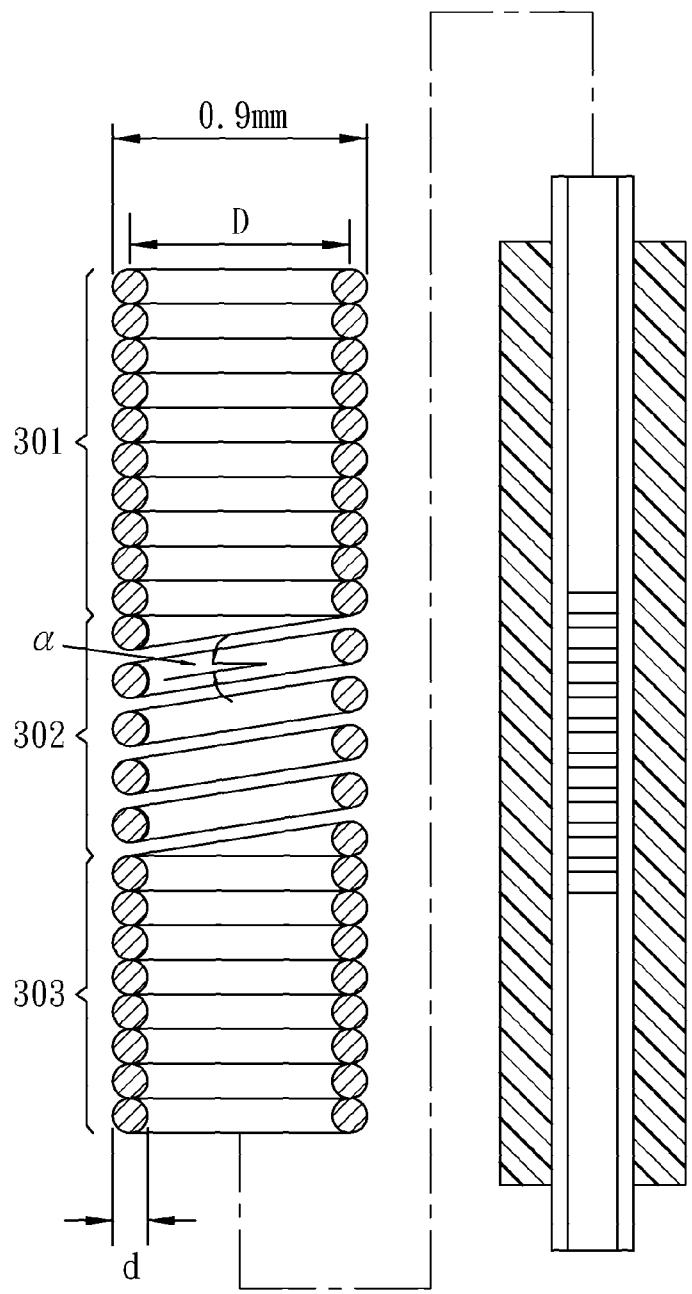
FIG. 3A is a sectional view of a spring structure and a fiber grating that are not yet assembled.
Figure 3B:
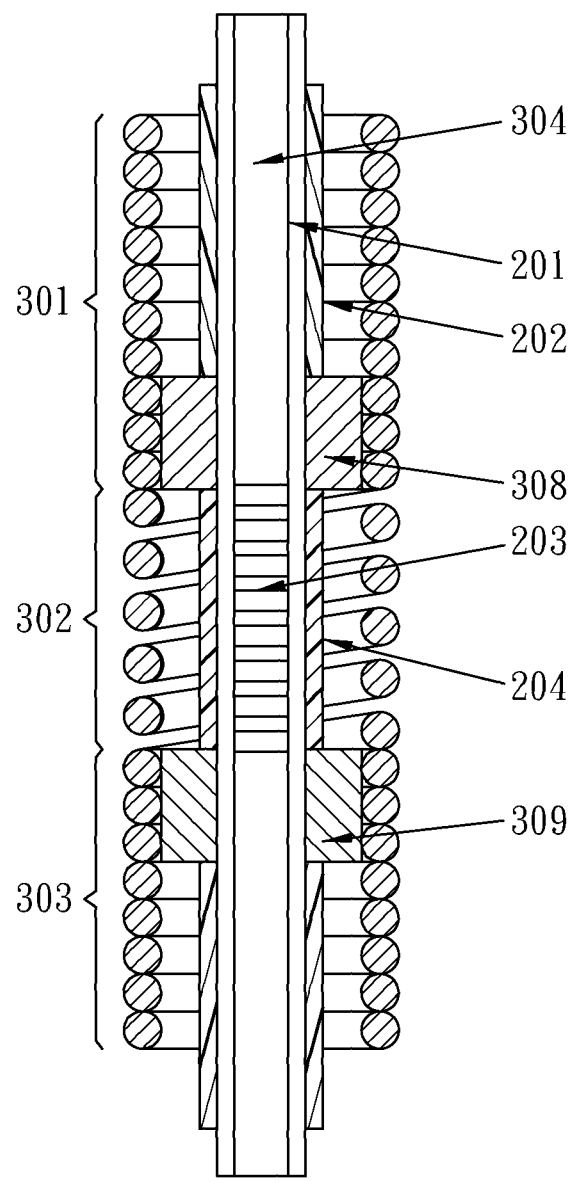
FIG. 3B is a sectional view of an optical fiber sensing spring structure.
Figure 3C:
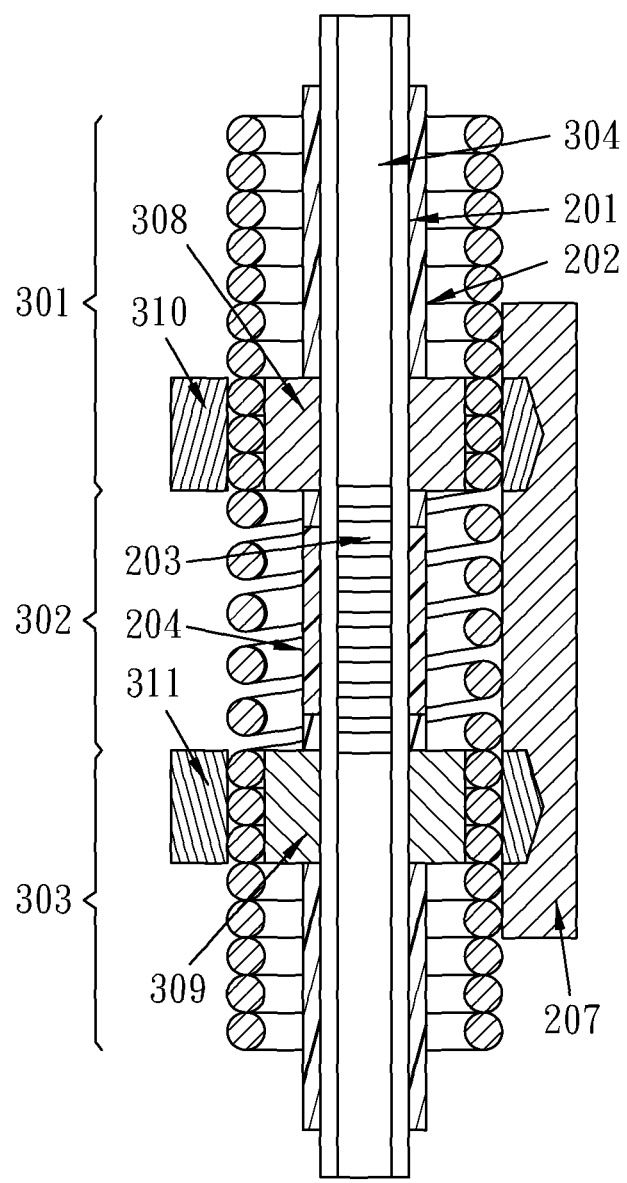
FIG. 3C is a sectional view of an optical fiber sensing element fixed to a structure under test.
Figure 3D:
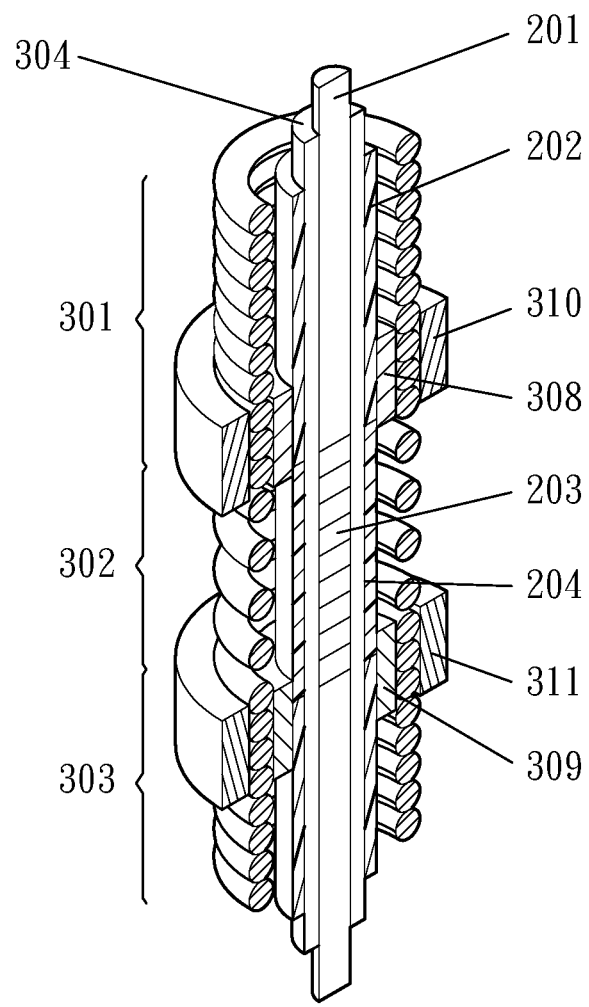
FIG. 3D is a perspective sectional structural view of an optical fiber sensing spring structure.
Figure 4:
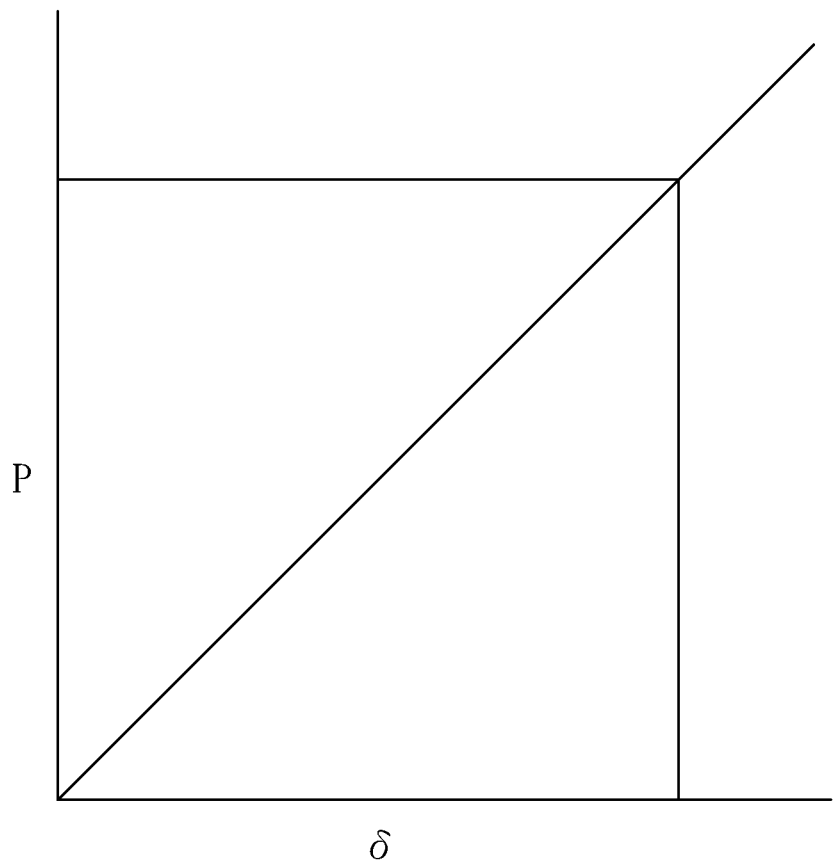
FIG. 4 shows a relationship between a load and deformation.
Figure 5:
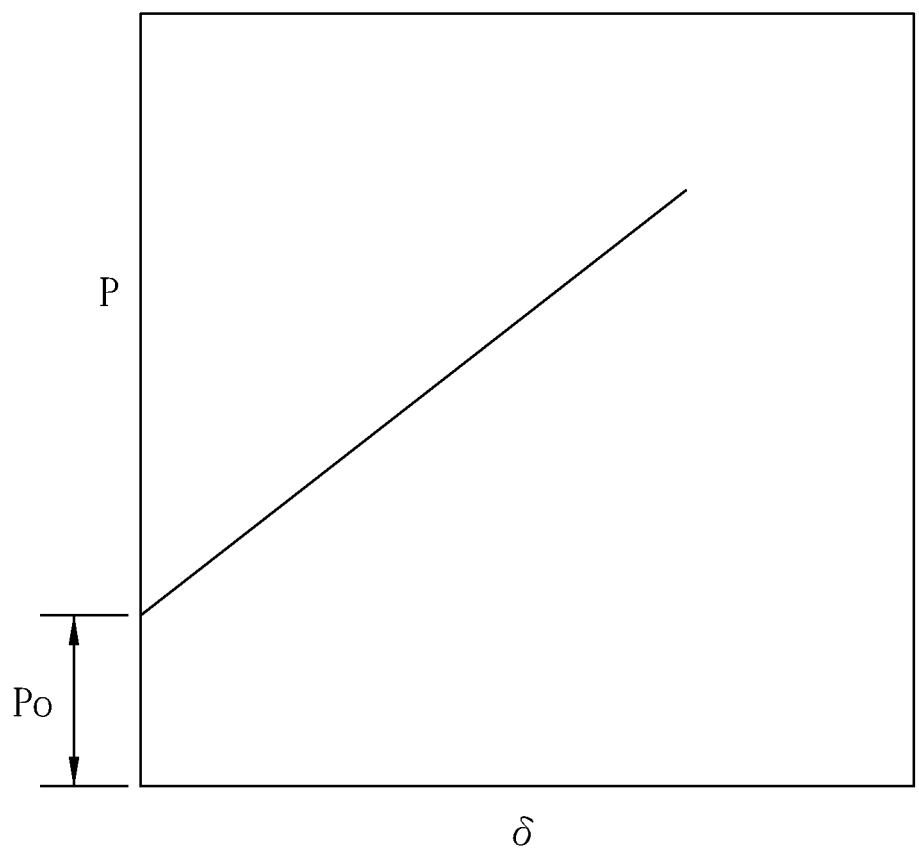
FIG. 5 shows the initial tension property in a relationship diagram between a load and deflection.
Figure 6:
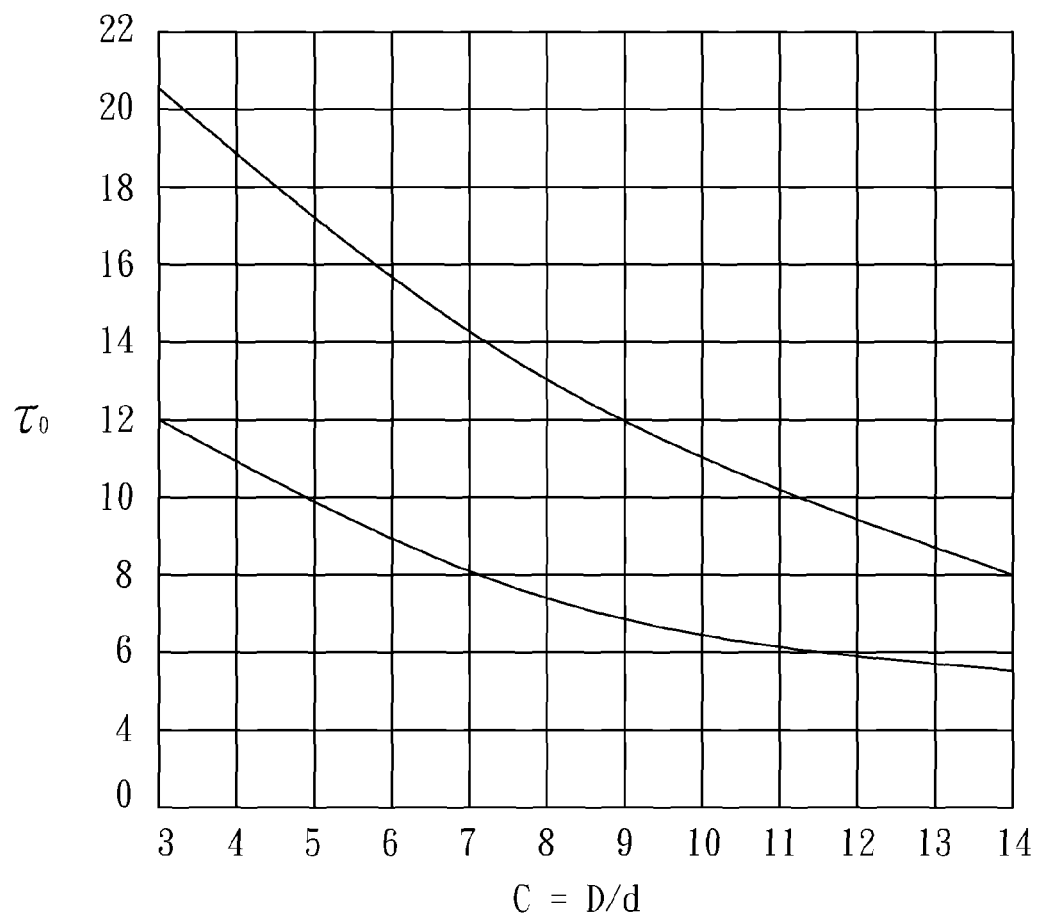
FIG. 6 shows a range indicated by an interval between the two lines in a relationship diagram of an initial strain and spring index.

In this embodiment, as shown in FIG. 3C, a tensed optical fiber sensing spring structure, e.g., the structure shown in FIG. 3B, is installed to a structure under test. The present invention provides an adjustable pre-tensed fiber grating structure, which protects an optical fiber placed therein by a fully spring jacketed length and satisfies a commercial standard of a 0.9 mm outer diameter. Further, the pre-tensed fiber grating structure includes a compression spring 302, which is utilized as a jacket having an outer diameter of 0.9 mm and is pre-compressed to form a stress-strain relationship in a linear elastic region. The compression spring 302 having a predetermined gauge length is compressed and then fixed to two ends of optical fiber and spring pre-tensing fixing and connecting rings, i.e., to positions of the upper connecting ring 308 and the lower connecting ring 309. When the two connecting rings are fixed at a bare optical fiber 201 that is not compressed in an axle of the compression spring at a fixed interval, a predetermined tension can be obtained after releasing the compression spring (which is equivalently pre-tensing an FBG on various types of conventional sensing element structures). When designing such compression spring characteristic, the requirement and calculation of −2500 μs pre-tensed strain can be achieved given the fiber grating is tensed by a 3 nm wavelength shift amount. As the section of the fiber grating is pre-tensed to induce a 3 nm wavelength shift amount according to a data relationship of a manufactured fiber grating, a force of 80 grams needs to be applied for pre-tensing per nm; the force that needs to be applied on the compression spring is 240 g (=0.24 kg), and P=0.24 kg. The deflection δ of the spring caused by a load P on the axle of the spring can be calculated by equation (8). In this embodiment, it is assumed that n is 50 coils, d=0.3 mm, D=1 mm, P=0.24 kg, and G is a stainless steel lateral elasticity coefficient of $7.5 \times 10^3$ kg/mm² From equation (8), it is obtained that, the deflection δ of the spring caused by the axial load P is δ=1.5 mm. That is, the compression coil spring is compressed by 1.5 mm, two sealing seat rings at the tension springs located closely at the two ends of the compression coil spring and the optical fiber placed therein are applied with a resin adhesive, which then cures to form connecting rings, and the compressed compression spring is then released. Alternatively, metal is pressed to form the connecting rings and then fixed, and the pre-tensed compression coil spring is then released. Thus, a force can then be applied on the optical fiber therein to produce an effect of pre-tensing by a 3 nm wavelength shift to further obtain a pre-strain of about −2500 μs, so as to withstand a maximum tolerable strain that is to be applied on the structure under test by a device. In the embodiment, both the FBG 203 and the optical fibers which are extended closely from the two ends of the FBG 203 and connected outside to next optical fiber's sensing spring assembly are receiving protection from the bendable optical fiber jacketing spring, because of having a hard housing outside compression coil spring 302 and the tension springs 301 and 303. To connect an optical fiber from the optical fiber placed in the spring, with welding or with optical fiber connectors may be utilized. Thus, the compression coil spring having an outer diameter of 0.9 mm placed around the FBG and the 0.9 mm tension springs successively connected closely at the two ends of the compression coil spring both achieve a function of protecting the optical fiber therein. Compared to various 0.9 mm polyethylene (PE) or polyvinyl chloride (PVC) or other fine woven fabric materials, an inventive step of the present invention is that, the compression coil spring and the tension coil springs connected closely at the two ends of the compression coil spring provide better bendability while also being harder. Further, the present invention features advantages of providing simplified manufacturing process and reduced costs for optical fiber sensing elements by a unique pre-tensing effect. Because the overall element has a reduced volume and the pre-tensed spring is utilized to jacket the fiber grating, the present invention may be referred to as a self-tensed and fully spring jacketed optical fiber sensing structure. The overall element, referred to as a self-tensed and fully spring jacketed optical fiber sensing structure, may be installed to various sensing occasions for special and minute sensing applications.

When the cylindrical compression coil spring is utilized as a spring for a precision apparatus, a spring having a load-deflection relationship that is in a complete linear ratio is required. That is, a spring that has a smaller number of effective coils and changes due to a change in the load is selected. For example, a cylindrical coil spring having a rectangular cross-section is selected. A length parallel to the spring axle of such spring is at least ⅝ of the spring pitch. Alternatively, the seat ring of the cylindrical coil spring having a circular cross-section is welded to discontinuously shift ineffective coils into 360° contact planes of effective coils. That is, in the present invention, with the method of forming connecting rings using the optical fiber, the spring and the cured resin adhesive, or by forming a spring having a rectangular cross-section through cutting coil channels from a tubal spring using a steel mill, an extremely precise measuring structure having an excellent elastic range is provided. Selecting a cylindrical coil spring having a rectangular cross-section to manufacture the optical fiber sensing spring of the present invention is a common approach.

In the first embodiment, the two ends of the outer jacketing cylindrical compression coil spring 302 are externally connected to the outer jacketing cylindrical tension coil springs 301 and 303. Alternatively, an outer jacketing cylindrical compression coil spring having a pitch angle smaller than that of 302 may also be applied. Given that the fiber grating is similarly pre-tensed by the compression coil spring, the self pre-tensed and fully spring jacketed optical fiber sensing spring structure can be formed.

In the first embodiment, the outer jacketing cylindrical tension coil springs 301 and 303 connected at the two ends of the outer jacketing cylindrical compression coil spring 302 may also be implemented by fully jacketing cylindrical compression coil springs having a pitch angle the same as that of the outer jacketing cylindrical compression coil spring 302 to become an optical fiber sensing spring that is fully jacketed with a cylindrical compression coil spring structure. An effect of the compression coil spring achieving the pre-tensing effect of the fiber grating is maintained, and the optical fiber and spring pre-tensing fixing and connecting rings at the two ends are sufficient for securely fixing the optical fiber and the spring as providing a condition of two tight seat ring portions, thereby similarly achieving the self pre-tensed and self jacketed and protected optical fiber sensing spring structure.

Figure 7:
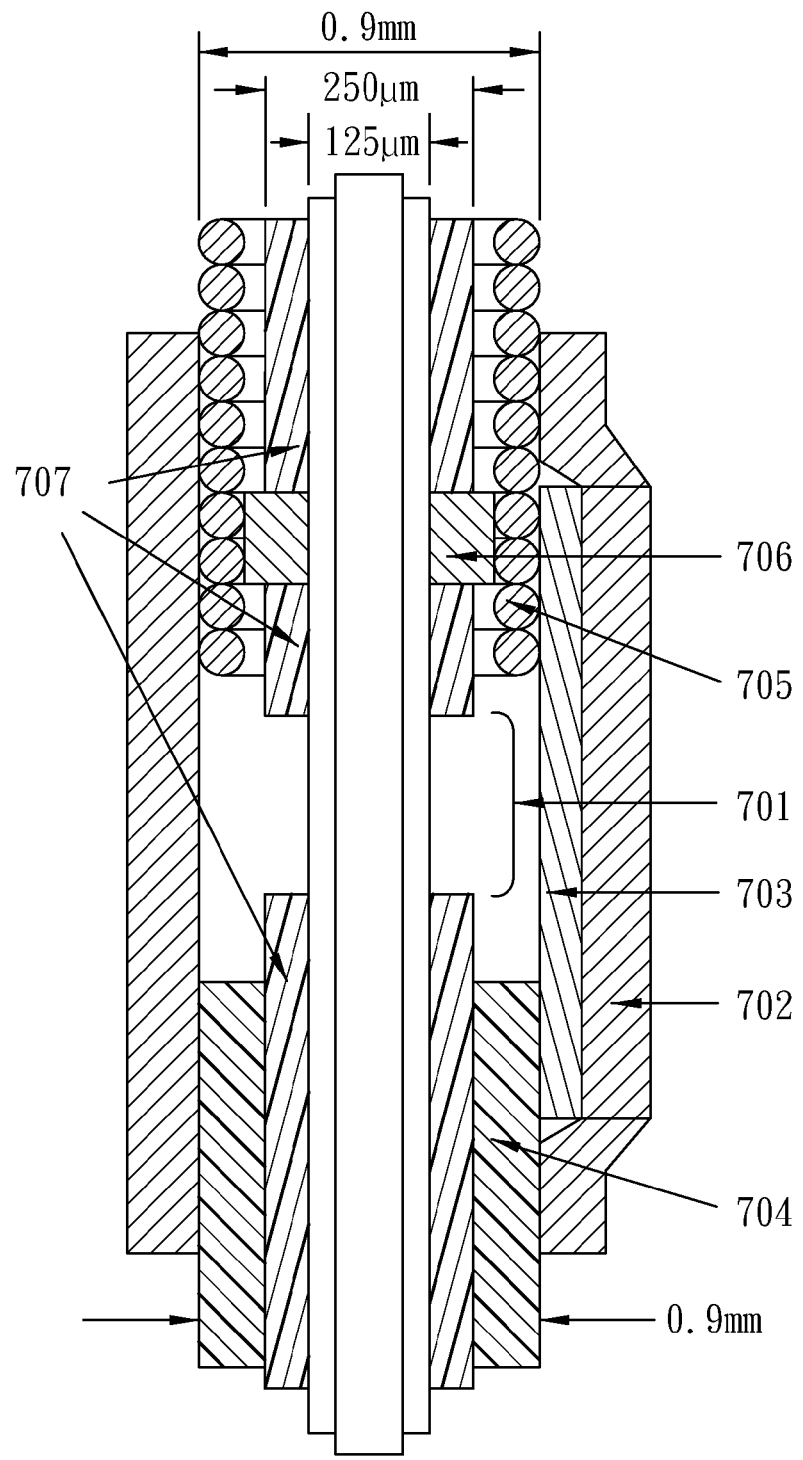
FIG. 7 shows a diagram of a 0.9 mm spring jacket and a heat shrinkable splicing protector of a 0.9 mm plastic coating extended and spliced optical fiber.

A 0.9 mm optical fiber conventionally coated by plastic may be welded and connected with the 0.9 mm spring jacketed optical fiber connected from the self-tensed and self-jacketed and protected optical fiber sensing spring of the present invention. FIG. 7 shows a diagram of a 0.9 mm spring jacket and a heat shrinkable splicing protector of a 0.9 mm plastic coating extended and spliced optical fiber. In FIG. 7, 701 represents 125 μm bare fiber welding regions with a 250 μm resin coating already removed from the optical fiber, 702 is a heat shrinkable splicing protector, 703 represents a reinforced steel rod in the heat shrinkable splicing protector, 704 is a plastic coating jacket having an outer diameter of 0.9 mm, 705 represents a jacketed spring having an outer diameter of 0.9 mm, 706 represents an optical fiber and spring fixing and connecting ring, and 707 represents a 250 μm resin coating protection layer. It is known from FIG. 7 that, the 250 μm resin coating protection layer is removed from each welding region of two optical fibers, and only a small section of bare optical fiber having an outer diameter of 125 μm is present. Therefore, a thermal sleeve having a larger area is required to encircle the bare optical fiber, and the connecting strength also needs to be reinforced by the protection rod 703 therein.

Second Embodiment

A temperature compensated optical fiber sensing spring structure is provided according to a second embodiment of the present invention.

Figure 8:
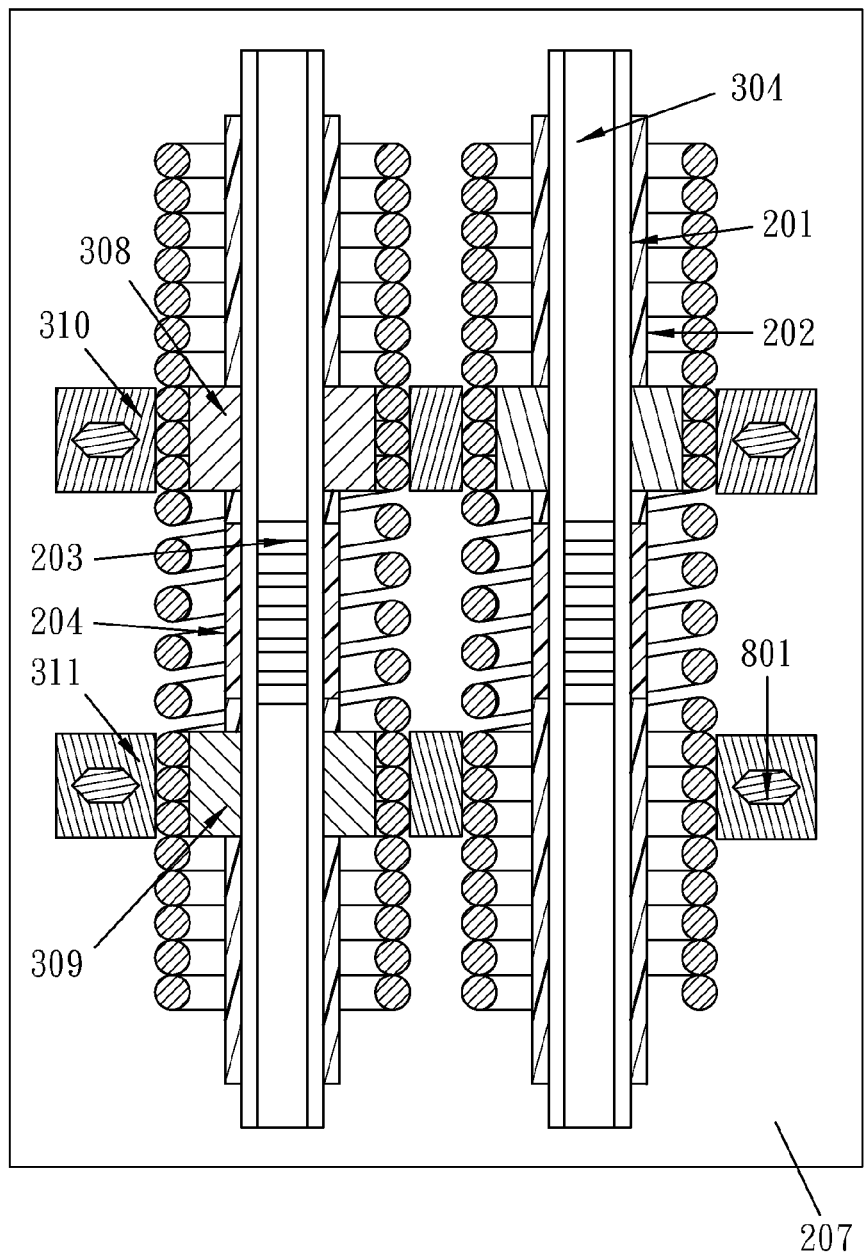
FIG. 8 is a structural diagram of a temperature compensated optical fiber sensing structure according to a second embodiment.

As previously described, the physical properties of an FBG are affected by temperature changes to further affect the wavelength drift $\Delta\lambda_B$. The wavelength drift caused by the temperature is often represented by $\Delta\lambda_{BT}$. Thus, when applying the FBG as any type of sensing device, multiple sensing devices, placed next to one another or closely connected in series, are utilized to obtain reference values of the wavelength drift $\Delta\lambda_{BT}$ caused by the same temperature change. The wavelength drift $\Delta\lambda_{BT}$ caused by the same temperature change region is then deducted to perform a function of temperature compensation and correction. In the second embodiment, a temperature compensated optical fiber sensing spring structure is as shown in FIG. 8. 801 represents a sensing spring carrier rivet. In FIG. 8, the two sets of optical fiber sensing springs arranged next to each other are made by fixing the optical fiber sensing spring in FIG. 3 on the structure 207 under test. One main difference is that, the lower optical fiber and spring pre-tensing fixing and connecting ring at the right side of the two sets of optical fiber sensing springs is excluded. In this structure, as the lower optical fiber and spring pre-tensing fixing and connecting ring is excluded, the fiber grating at the right side is single-end fixed and receives purely temperature strain effects of the fiber grating instead of also receiving strain effects of the structure or the spring. Thus, such structure can be fixed on the structure under test to perform temperature compensation. This spring jacketed fiber grating structure is capable of protecting the fiber grating, and may be connected in series with other cylindrical springs having the same outer diameter to maintain a consistent jacketed structure.

Throughout the disclosure of the present invention, various details and reference denotations of elements used in the embodiments may be regarded as the same or functionally similar elements. Further, the drawings are kept simple to illustrate main features of the embodiments. It should be noted that, the drawings are not drawn to depict all features of the embodiments, nor they are drawn to relative sizes and quantities of the elements or to true scales. Instead, the drawings are drawn to fully illustrate the fundamental spirit of the optical fiber sensing spring, the elements forming the optical fiber sensing spring, and the sensing structure assembly. One person skilled in the art can easily implement the optical fiber sensing spring in various modifications to exercise equivalent functions. For example, in one embodiment, a cylindrical coil spring having a rectangular cross-section is selected, and cylindrical coil springs having different pitch angles are selected and connected in series to form different combinational structures. Alternatively, a different spring index c may be selected; i.e., c=D/d. Further, in other modifications, different combinations of springs having different outer diameters and wire diameters, and fine-tuning the various manufacturing parameters, such as the lateral elasticity coefficient G of the steel material, can be made, as such modifications are also applied within the scope of the present invention. Thus, applications of the optical fiber sensing spring can become more versatile and diversified.

In the disclosure, a pre-tensed optical fiber sensing spring is installed to a sensing device on a structure under test, and structures formed by other cylindrical coil springs having different pitch angles are depicted to illustrate the sensing spring strain gauge structure of the present invention. It should be noted that, the above exemplary details and embodiments are not to be construed as limitations to the present invention. In possible implementation, without departing from the spirit of the present invention, modifications and changes can be made to these embodiments of the present invention.

Without further analysis on the above main concepts of the present invention as disclosed in the application, a certain number of optical fiber sensing spring units may be assembled and connected in series or parallel in various structure arrays under test to respectively output and access these signal networking systems for safety. Based on the current knowledge and teaching as well as incorporating prior technical features, one person skilled in the art can easily make appropriate modifications to the present invention for different applications or apply other materials to the present invention. Such variations and modifications are encompassed within the equivalent meanings and range of the appended claims.

What is claimed is:

1. A self-tensed and fully spring jacketed optical fiber sensing structure, comprising:
   a single-mode optical fiber, comprising a lengthwise fiber grating therein;

a cylindrical coil spring, having a fixed length, jacketing and protecting the single-mode optical fiber been placed therein, comprising a longer cylindrical tension coil spring, a shorter cylindrical compression coil spring connected in series to the cylindrical tension coil spring, and a longer cylindrical tension coil spring connected in series to the cylindrical compression coil spring, the shorter cylindrical compression coil spring being located between the two longer cylindrical tension springs;

a pre-tensing front-end connecting ring of optical fiber and spring, externally connected to the spring and internally connected to the optical fiber; and a pre-tensing rear-end connecting ring of optical fiber and spring, externally connected to the spring and internally connected to the optical fiber;

wherein, the optical fiber sensing spring structure is characterized that, a predetermined gauge length is formed between the pre-tensing front-end connecting ring and pre-tensing rear-end connecting ring; the gauge length is determined by first fixing the front-end and rear-end connecting rings when a maximum tolerable compression strain amount is obtained from compressing two ends of the cylindrical compression coil spring surrounding and protecting the fiber grating to the predetermined fiber grating been placed therein, and then releasing a force applied, and thus by a pre-tensing effect achieved by elastically stretching the fiber grating within an elastic region; the cylindrical tension coil springs extended from the two ends of the cylindrical compression spring that jackets and protects the fiber grating and having a same outer diameter provide a protection function by a full jacketing spring material to protect the optical fiber placed therein, thereby becoming the self-tensed and fully spring jacketed optical fiber sensing structure.

2. The self-tensed and fully spring jacketed optical fiber sensing structure of claim 1, wherein the pre-tensing front-end connecting ring of optical fiber and spring, and the pre-tensing rear-end connecting ring of optical fiber and spring are formed by pressing or curing a material that is same as the externally connected springs.

3. The self-tensed and fully spring jacketed optical fiber sensing structure of claim 1, wherein the pre-tensing front-end connecting ring of optical fiber and spring, and the pre-tensing rear-end connecting ring of optical fiber and spring are formed by glue curing a coating material of the internally connected optical fiber.

4. The self-tensed and fully spring jacketed optical fiber sensing structure of claim 1, wherein the cylindrical coil springs are a spring structure having a circular cross-section.

5. The self-tensed and fully spring jacketed optical fiber sensing structure of claim 1, wherein the cylindrical coil springs are a spring structure having a rectangular cross-section.

6. The self-tensed and fully spring jacketed optical fiber sensing structure of claim 1, wherein the jacketed springs having an outer diameter of 0.9 mm, can be externally welded and connected with an 0.9 mm outer diameter plastic jacketed optical fibers after internally splicing with lead-out optical fibers, in order to protect inside spliced optical fiber by using thermal curable sleeve herein.

7. A self-tensed and fully spring jacketed optical fiber sensing structure, comprising:

a single-mode optical fiber, comprising a long fiber grating therein;

a cylindrical coil spring, having a fixed length, jacketing and protecting the single-mode optical fiber been placed therein, comprising a cylindrical tension coil spring having a smaller pitch angle, a cylindrical compression coil spring having a larger pitch angle and connected in series to the cylindrical tension coil spring, and a cylindrical tension coil spring having a smaller pitch angle and connected in series to the cylindrical compression coil spring, the cylindrical compression coil spring having the larger pitch angle being located between the two cylindrical tension springs having the smaller pitch angles;

a pre-tensing front-end connecting ring of optical fiber and spring, externally connected to the spring and internally connected to the optical fiber; and a pre-tensing rear-end connecting ring of optical fiber and spring, externally connected to the spring and internally connected to the optical fiber;

wherein, the optical fiber sensing spring structure is characterized that, a predetermined gauge length is formed between the pre-tensing front-end connecting ring and pre-tensing rear-end connecting ring; the gauge length is determined by first fixing the front-end and rear-end connecting rings when a maximum tolerable compression strain amount is obtained from compressing two ends of the cylindrical compression coil spring having the larger pitch angle and not only surrounding but also protecting the fiber grating to the predetermined fiber grating been placed therein, and then releasing a force applied, and thus by a pre-tensing effect achieved by elastically stretching the fiber grating within an elastic region; the cylindrical tension coil springs extended from the two ends of the cylindrical compression spring having the larger pitch angle, jacketing and protecting the fiber grating, having a same outer diameter provide a protection function by a full jacketing spring material to protect the optical fiber placed therein, thereby becoming the self-tensed and fully spring jacketed optical fiber sensing structure.

8. The self-tensed and fully spring jacketed optical fiber sensing structure of claim 7, wherein the pre-tensing front-end connecting ring of optical fiber and spring, and the pre-tensing rear-end connecting ring of optical fiber and spring are formed by pressing or curing a material that is same as the externally connected springs.

9. The self-tensed and fully spring jacketed optical fiber sensing structure of claim 7, wherein the pre-tensing front-end connecting ring of optical fiber and spring, and the pre-tensing rear-end connecting ring of optical fiber and spring are formed by glue curing a coating material of the internally connected optical fiber.

10. The self-tensed and fully spring jacketed optical fiber sensing structure of claim 7, wherein the cylindrical coil springs are a spring structure having a circular cross-section.

11. The self-tensed and fully spring jacketed optical fiber sensing structure of claim 7, wherein the cylindrical coil springs are a spring structure having a rectangular cross-section.

12. The self-tensed and fully spring jacketed optical fiber sensing structure of claim 7, wherein the jacketed springs having an outer diameter of 0.9 mm, can be externally welded and connected with an 0.9 mm outer diameter plastic jacketed optical fibers after internally splicing with lead-out optical fibers, in order to protect inside spliced optical fiber by using a heat shrinkable splicing protector herein.

13. A self-tensed and fully spring jacketed optical fiber sensing structure, comprising:

a single-mode optical fiber, comprising a long fiber grating therein;

a cylindrical compression coil spring, having a fixed length, jacketing and protecting the single-mode optical fiber been placed therein;

a pre-tensing front-end connecting ring of optical fiber and spring, externally connected to the spring and internally connected to the optical fiber; and a pre-tensing rear-end connecting ring of optical fiber and spring, externally connected to the spring and internally connected to the optical fiber;

wherein, the optical fiber sensing spring structure is characterized that, a predetermined gauge length is formed between the pre-tensing front-end connecting ring and pre-tensing rear-end connecting ring; the gauge length is determined by first fixing the front-end and rear-end connecting rings when a maximum tolerable compression strain amount is obtained from compressing two ends of the cylindrical compression coil spring surrounding and protecting the fiber grating to the predetermined fiber grating been placed therein, and then releasing a force applied, and thus by a pre-tensing effect achieved by elastically stretching the fiber grating within an elastic region; the cylindrical compression coil springs extended from the two ends of the cylindrical compression spring that jackets and protects the fiber grating and having a same outer diameter provide a protection function by a full jacketing spring material to protect the optical fiber placed therein, thereby becoming the self-tensed and fully spring jacketed optical fiber sensing structure.

14. The self-tensed and fully spring jacketed optical fiber sensing structure of claim 13, wherein the pre-tensing front-end connecting ring of optical fiber and spring, and the pre-tensing rear-end connecting ring of optical fiber and spring are formed by pressing or curing a material that is same as the externally connected springs.

15. The self-tensed and fully spring jacketed optical fiber sensing structure of claim 13, wherein the pre-tensing front-end connecting ring of optical fiber and spring, and the pre-tensing rear-end connecting ring of optical fiber and spring are formed by glue curing a coating material of the internally connected optical fiber.

16. The self-tensed and fully spring jacketed optical fiber sensing structure of claim 13, wherein the cylindrical coil spring is a spring structure having a circular cross-section.

17. The self-tensed and fully spring jacketed optical fiber sensing structure of claim 13, wherein the cylindrical coil spring is a spring structure having a rectangular cross-section.

18. The self-tensed and fully spring jacketed optical fiber sensing structure of claim 13, wherein the jacketed springs having an outer diameter of 0.9 mm, can be externally welded and connected with an 0.9 mm outer diameter plastic jacketed optical fibers after internally splicing with lead-out optical fibers, in order to protect inside spliced optical fiber by using thermal curable sleeve herein.

19. A fully spring jacketed optical fiber cable structure, comprising:

an optical fiber, having a fixed length a cylindrical tight tension coil spring, having a fixed length, jacketing and protecting the optical fiber been placed therein;

a front-end connecting ring of optical fiber and spring, externally connected to the spring and internally connected to the optical fiber; and a rear-end connecting ring of optical fiber and spring, externally connected to the spring and internally connected to the optical fiber having the fixed length;

wherein, the optical fiber spring cable structure is characterized that, a predetermined jacketing and protecting total tensile strength for a full section of the optical fiber cable is formed from the front-end connecting ring of optical fiber and spring to the rear-end connecting ring of optical fiber and spring; the predetermined jacketing and protecting total tensile strength is formed by both an initial tension strength of the cylindrical tight tension coil spring surrounding and protecting the optical fiber been placed therein and a tensile strength of the optical fiber, to protect the full section of the optical fiber been placed therein.

20. The fully spring jacketed optical fiber cable structure of claim 19, wherein the front-end connecting ring of optical fiber and spring, and the rear-end connecting ring of optical fiber and spring are formed by pressing or curing a material that is same as the externally connected springs.

21. The fully spring jacketed optical fiber cable structure of claim 19, wherein the front-end connecting ring of optical fiber and spring, and the rear-end connecting ring of optical fiber and spring are formed by glue curing a coating material of the internally connected optical fiber.

22. The fully spring jacketed optical fiber cable structure of claim 19, wherein the cylindrical coil springs are a spring structure having a circular cross-section.

23. The fully spring jacketed optical fiber cable structure of claim 19, wherein the cylindrical coil springs are a spring structure having a rectangular cross-section.

24. The fully spring jacketed optical fiber cable structure of claim 19, wherein the jacketed springs having an outer diameter of 0.9 mm, can be externally welded and connected with an 0.9 mm outer diameter plastic jacketed optical fibers after internally splicing with lead-out optical fibers, in order to protect inside spliced optical fiber by using thermal curable sleeve herein.

* * * * *